United States Patent [19]
Marshall et al.

[11] Patent Number: 5,880,573
[45] Date of Patent: Mar. 9, 1999

[54] LOW-COST PHASE-LOCK MOTOR CONTROL METHOD AND ARCHITECTURE

[75] Inventors: Stephen W. Marshall, Richardson; Richard C. Meyer, Plano; Harold E. Bellis, II, Garland, all of Tex.

[73] Assignee: Texas Instruments Incorporated, Dallas, Tex.

[21] Appl. No.: 662,192

[22] Filed: Jun. 12, 1996

[51] Int. Cl.$^6$ .................................................. H02P 7/36
[52] U.S. Cl. ............................................ 318/805; 318/632
[58] Field of Search .................................... 318/799–815, 318/632, 623, 430

[56] References Cited

U.S. PATENT DOCUMENTS

| | | | |
|---|---|---|---|
| 3,567,850 | 3/1971 | Habel | 360/70 |
| 4,193,020 | 3/1980 | Song | 388/812 |
| 4,216,419 | 8/1980 | Dam et al. | 388/813 |
| 4,283,671 | 8/1981 | Nakano et al. | 318/608 |
| 4,543,516 | 9/1985 | Kobori et al. | 388/813 |
| 4,599,545 | 7/1986 | Moriki et al. . | |
| 4,998,163 | 3/1991 | Salvati . | |
| 5,046,162 | 9/1991 | Ishikawa et al. . | |
| 5,086,261 | 2/1992 | Kakata et al. . | |
| 5,365,283 | 11/1994 | Doherty et al. . | |
| 5,625,264 | 4/1997 | Yoon | 318/254 |

FOREIGN PATENT DOCUMENTS

| | | |
|---|---|---|
| 0 020 211 A1 | 12/1980 | European Pat. Off. . |
| 0 280 931 A1 | 9/1988 | European Pat. Off. . |
| 0 712 253 A2 | 5/1996 | European Pat. Off. . |
| 2 132 387 | 7/1984 | United Kingdom . |
| 2 143 059 | 1/1985 | United Kingdom . |

*Primary Examiner*—Jonathan Wysocki
*Attorney, Agent, or Firm*—Charles A. Brill; Frederick J. Telecky, Jr.; Richard L. Donaldson

[57] ABSTRACT

A motor control system provides a low-cost method of phase-locking a motor to an input timing signal. Timer circuits 502, 506 measure the period of a timing signal and the relative phase between the timing signal and a motor rotor. A frequency command generator circuit 520 outputs a motor speed command based on the period of the timing signal and the relative phase of the timing signal compared to the motor rotor. The motor speed command controls the output of a motor driver circuit which drives the motor rotor speed synchronously with the input timing signal. The rotor speed is gradually altered to adjust the relative phase between the input timing signal and the motor rotor. This results in a small frequency-lock error being used to maintain a predetermined phase relationship between the timing signal and the motor rotor.

15 Claims, 4 Drawing Sheets

LOW-COST PHASE-LOCK MOTOR CONTROL METHOD AND ARCHITECTURE

FIELD OF THE INVENTION

This invention relates to the field of motor control systems, more particularly to phase-locked color wheel systems.

BACKGROUND OF THE INVENTION

Display systems are commonly used to convey information to system observers. Display systems typically include some type of spatial light modulator, such as a Cathode Ray Tube (CRT) or Liquid Crystal Display (LCD) to form a modulated light image. One new type of display system, which has the capability to replace the conventional Cathode Ray Tube (CRT) based display system in many applications, is based on Texas Instruments' Digital Micromirror Device (DMD). The DMD is an integrated circuit that includes a large number of very small mirrors on the surface of the circuit. A typical DMD may have over one million mirrors, each approximately 17 μm across, in a sealed package having a transparent cover over the mirrors. Addressing circuitry in the DMD is used to electrostatically rotate each mirror +/−10° about a hinge axis. The rotated position of the mirror determines the direction incident light will be deflected from the surface of the mirror.

In a typical DMD-based display system, a projection lamp generates a beam of light which is focused onto the surface of the DMD. The incident beam of light generally strikes the surface of the DMD along a path which is 20° from normal to the surface of the DMD. Mirrors which are rotated to a first "on" position reflect the incident light along a path which is normal to the surface of the DMD. Mirrors which are rotated in the opposite "off" direction, reflect light along a path which is 40° from normal to the surface of the DMD and 60° away from the incident light beam.

A projection lens is used to capture the light which has been reflected by the DMD along a path normal to the surface of the DMD. The projection lens focuses this light onto a viewing screen. Each mirror has a one-to-one relationship with a portion of the viewing screen such that for each mirror that is rotated to the "on" position, there is a corresponding bright spot on the viewing screen. The bright spots collectively form an image which may be interpreted by a viewer.

Realistic images require many intensity levels to represent realistically life-like shading and contouring. However, modern versions of the DMD are only designed to operate in either the on position, in which all of the light incident on the mirror is reflected onto the viewing screen, or in the off position, in which none of the incident light is reflected onto the viewing screen. Therefore, time based integration methods are used to create images which have multiple intensity levels. Typical video signals are transmitted as a series of video frames, or images, each frame representing the complete image at a given point in time. Time based integration is implemented by breaking each image frame into a series of subframes. Individually, each subframe is a single-intensity version of the desired image and does not represent the entire image accurately. But, because the human eye integrates a series of instantaneous images, a series of subframes may be created which will appear, to the human eye, to be a single image with multiple intensity levels.

Multiple beams of colored light are used to generate a full-color image. For example, the output of three separate image display systems, one with a red light source, one with a green light source, and one with a blue light source, may be combined to create a full-color image. Alternatively, a single image display system sequentially may use three light sources to generate a full-color image. Once again, the integration properties of the human eye are relied upon to blend the three monochromatic images of a color-serial display system into a single full-color image.

SUMMARY OF THE INVENTION

In accordance with the present invention, a motor control system is provided which provides a low-cost method of phase-locking a motor to an input timing signal. According to one embodiment of the present invention, a timer circuit measures the period of a timing signal and the relative phase between the timing signal and a motor rotor. A frequency command generator circuit outputs a motor speed command based on the period of the timing signal and the relative phase of the timing signal compared to the motor rotor. The motor speed command controls the output of a motor driver circuit such that the motor driver circuit drives the motor rotor speed synchronously with the input timing signal. The motor speed command also causes the motor driver to gradually alter the rotor speed thereby adjusting the relative phase between the input timing signal and the motor rotor. The frequency command generator introduces a small frequency-lock error in order to change the phase relationship between the rotor and the timing signal.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
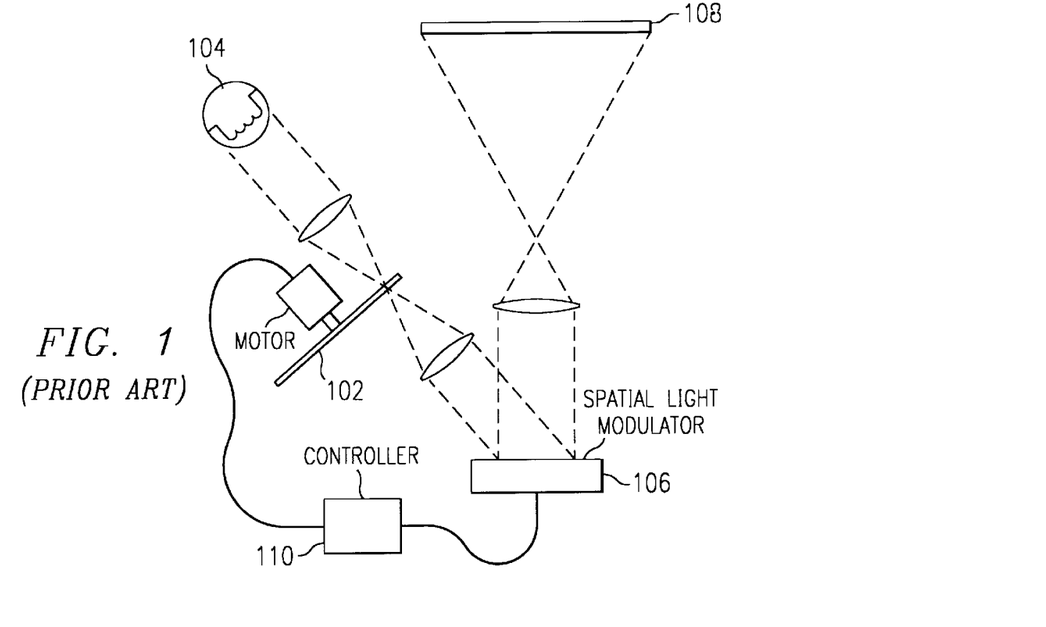
FIG. 1 is a diagram of a projection display system.

An efficient method of generating three single-color images, shown in FIG. 1, is to use a single display system with a color wheel 102 added in the light path. In FIG. 1, light from a light source 104 passes through the color wheel 102 and is focused on a spatial light modulator 106. The spatial light modulator 106 modulates the light to form an image bearing light beam which is projected onto a viewing surface 108. A controller 110 writes image data to the spatial light modulator 106 and synchronizes the operation of the spatial light modulator 106 with the rotation of the color wheel 102.

Figure 2:
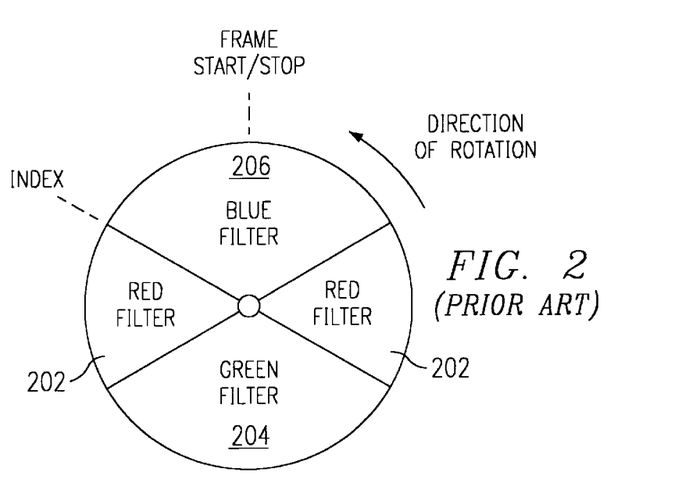
FIG. 2 is a view of a color wheel of one embodiment of the projection display system in FIG. 1.

The color wheel 102, shown in FIG. 2, is typically a transparent disk on which three different colored light filters are attached. The three light filters preferably abut on the wheel in order to maximize the amount of time the light passing through the color wheel is monochromatic. As the color wheel turns in the light path, the light passing through the wheel will be change from one color to the next. If the speed of the color wheel equals the rate at which the image frames are provided, each of the filters rotates through the light path during each frame, and each image frame is comprised of several monochromatic images. As described in U.S. Pat. No. 5,339,116, titled "DMD Architecture And Timing For Use In A Pulse-Width Modulated Display System," issued Jan. 11, 1994, each of the monochromatic image frames is comprised of multiple bit-planes, allowing the image perceived by the human eye to include a full range of colors and intensities.

The color wheel 102 shown in FIG. 2 includes red 202, green 204, and blue 206 filters, each covering one-third of the color wheel surface. The red filter is comprised of two segments while the green and blue filters are a single segment. The rotation of the color wheel is synchronized with the video frames so that each frame of video data is displayed during a period that begins and ends when the light beam is passing through the middle of the blue filter. Many other color filter combinations are possible. For example, a color wheel 102 may be fabricated with six segments, or any other number of segments. Additionally, a four-segment color wheel could have two blue segments or two green segments instead of the two red segments shown in FIG. 2.

Figure 3:
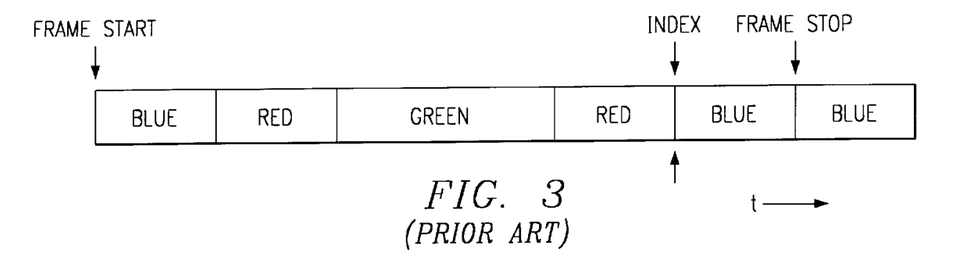
FIG. 3 is a timeline showing the time periods during which the color wheel of FIG. 2 generates each color.

A simplified timeline showing the periods in which the three colors are displayed is shown in FIG. 3. The bit sequences shown in FIG. 3 are for instructional purposes only and do not represent the optimum bit sequences. To avoid artifacts, the display period for some of the longer image bits is typically broken up into multiple non-contiguous display periods. Additionally, in horizontal split reset DMD systems, separate portions of the spatial light modulator will display the image bits in a unique order A frequency-locked loop circuit may be used to synchronize the operation of the spatial light modulator and the motor used to turn the color wheel. In a frequency-locked system, motor speed is synchronized to the vertical synchronization signal, VSYNC, component of the input video signal, which indicates the beginning of each image frame. An image frame buffer stores one image frame until the color wheel reaches a point where a given filter enters the light path signalling that a new display frame is to begin. Typically, a position sensor outputs a signal, INDEX, indicating the beginning of a new display frame. After the INDEX signal is received, the display system reads the image data from the frame memory and writes it to the spatial light modulator.

A frequency-locked control circuit has the advantage of being simple to design, but requires an additional frame memory, which drives up the cost of the display, in order to buffer the output of the image processing circuitry prior to input to the spatial light modulator. Furthermore, because control systems always have some uncorrected errors, a frequency-locked loop will have some frequency error implying that the buffer/frame memory will be over/under filled. This error may cause the display system to skip a frame of data and lead to visible temporal artifacts in the projected image.

The additional frame memory may be eliminated by phase-locking the color wheel to the incoming video signal. When the color wheel is phase-locked to the input video signal, there is a pre-determined relationship between the VSYNC and INDEX signals. A phase-locked display system allows the image processing circuitry to write one frame of image data into a frame memory while the prior frame of image data is read out of a second frame memory by the spatial light modulator.

A phase-locked color wheel driver circuit presents several problems. First, the circuitry required to phase-lock the wheel to the incoming video signal is more expensive and complex than the circuitry required to merely frequency-lock that wheel to the incoming video signal. Second, if the display system is switched between input signals, such as occurs when the channel received by a television system is changed, or if the input signal is temporarily lost, the controller will lose phase-lock and must then phase-lock to the new VSYNC signal. Users of the image display systems are not willing to wait long periods while the color wheel is re-synchronized to the new VSYNC signal. In order to phase-lock to the new VSYNC signal rapidly, the motor driving the color wheel must have enough output torque to change the velocity of the color wheel abruptly. Because the cost of the color wheel motor rises with output torque, the output torque of the color wheel motor must be carefully balanced to minimize the cost of motor while still providing acceptable performance.

A similar problem is encountered when designing a display system that is capable of displaying video sequences from sources which have different frame rates. For example, European television is typically broadcast at 50 frames per second, while North American television systems broadcast video signals at a 60 frame per second rate. Video images that are generated by computer systems are often displayed at 72 frames per second. Because of the abrupt changes in color wheel velocity necessary to change quickly between different frame rates, the cost of the color wheel motor tends to increase on systems that are capable of displaying images at more than one frame rate.

One solution is based on the realization that a frequency-locked loop is a phase-locked loop with an arbitrary phase relationship between the input signal and the output signal. This realization allows the use of a simple and cost-effective frequency-locked motor controller to drive the color wheel motor, with the addition of a controller to introduce a frequency error signal which will drive the color wheel from an arbitrary position to the desired position without requiring a rapid change in the velocity of the color wheel.

First Embodiment

Figure 4:
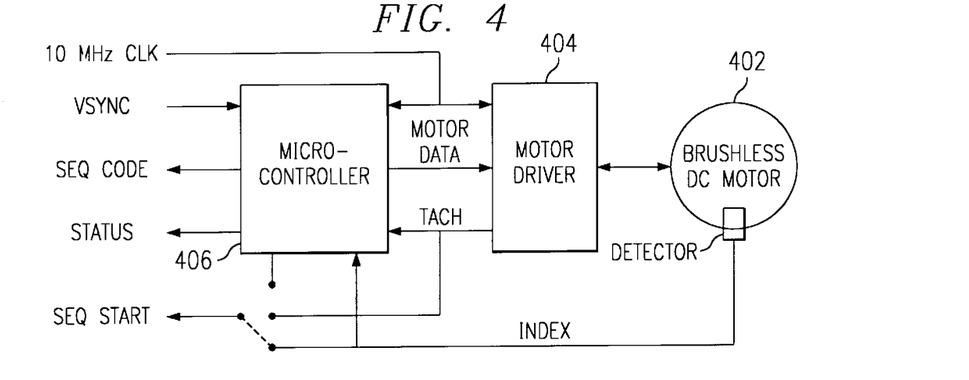
FIG. 4 is a block diagram of one embodiment of a motor control circuit of the projection display system in FIG. 1.

A first embodiment of a phase-locked motor controller, as discussed above for use in a single-modulator sequential-color display system, is shown in FIG. 4. In FIG. 4, a three-phase DC motor 402, such as a Nidec model 32S8754010, is used to turn a four to six-inch color wheel.

A three-phase brushless DC motor controller/driver 404, such as the Allegro A8902CLBA, is used to drive the motor 402 at a constant frequency. In this embodiment, the motor driver 404 receives a 14-bit period word that represents the desired period of one revolution of the motor. The period word is loaded into a 14-bit internal counter which is decremented every 16 input clock cycles. The controller generates a reference waveform which stays active until the counter reaches zero. The length of the reference waveform represents the time required for one revolution of the motor 402 at the desired speed.

The driver 404 also generates a signal, TACH, which represents the actual period of time required for one revolution of the motor 402. In this embodiment, the controller generates the TACH signal by sensing the back-EMF zero crossings of the motor 402, and dividing by 24 (3 phases times 8 poles). However, in other embodiments an external position indicator may be used. In the present embodiment, the state of the TACH signal changes with each revolution of the motor.

On alternate revolutions of the motor 402, the driver 404 compares the period of the TACH signal to the period of the reference signal. Depending on which signal ends first, a charge pump internal to the driver 404 integrates either up or down to control the current provided to the motor 402, thereby enabling the driver 404 to alter the speed of the motor 402.

Microcontroller 406 converts the circuit from a simple frequency-locked loop controller to an inexpensive phase-locked control circuit by modifying the 14-bit period word which is written into the driver 404. Microcontroller 406 monitors a color wheel position signal, INDEX, which strobes active when the color wheel rotates to a particular point. For example, INDEX may strobe active when the border between the red and blue filters crosses the light path. By measuring the VSYNC period and the relationship between the VSYNC and INDEX signals, the controller 406 determines the phase of the color wheel relative to the VSYNC signal.

The controller 406 alters the phase of the color wheel by temporarily increasing or decreasing the period word written to the driver 404. Slight changes in the period word cause the driver 404 to increase or decrease the speed of the motor 402 by a very small amount. If the actual color wheel position lags the desired color wheel position, as determined by the phase measurement between the VSYNC and INDEX signals, the speed of the motor is slightly increased until the color wheel advances to the proper phase relationship with VSYNC.

Television broadcasts in the United States have a field rate of about 60 Hz. Therefore the color wheel should nominally spin at 3600 rpm, or complete one revolution every 16.67 mS. If a 10 MHz clock is used to clock the driver 404, the 14-bit period counter is decremented at a 625 kHz rate, and the period word is nominally 10,417 which equates to a motor speed of 3,599.88 rpm.

As discussed above, it is important to limit the velocity profile of the color wheel motor. This not only reduces the cost of the motor required to spin the color wheel, but also reduces the overshoot and undershoot that will occur as the motor driver 404 attempts to change the speed of the motor. In a first embodiment, the phase loop adjustment range of the color wheel period is limited to +/−51.2 $\mu$S. The narrow range of wheel velocities (+/−0.18 rps) reduces the torque load on the motor 402 while allowing a worst-case phase error of 180° to be corrected within 5 seconds. For the nominal motor speed of 60 rpm discussed above, the controller 406 may increase the motor speed to a maximum of 3611 rpm, or decrease the motor speed to a minimum of 3589 rpm while still maintaining the velocity profile. These minimum and maximum speeds require the controller 406 to change the period word by +/−32.

Operation of the Microcontroller

Figure 5:
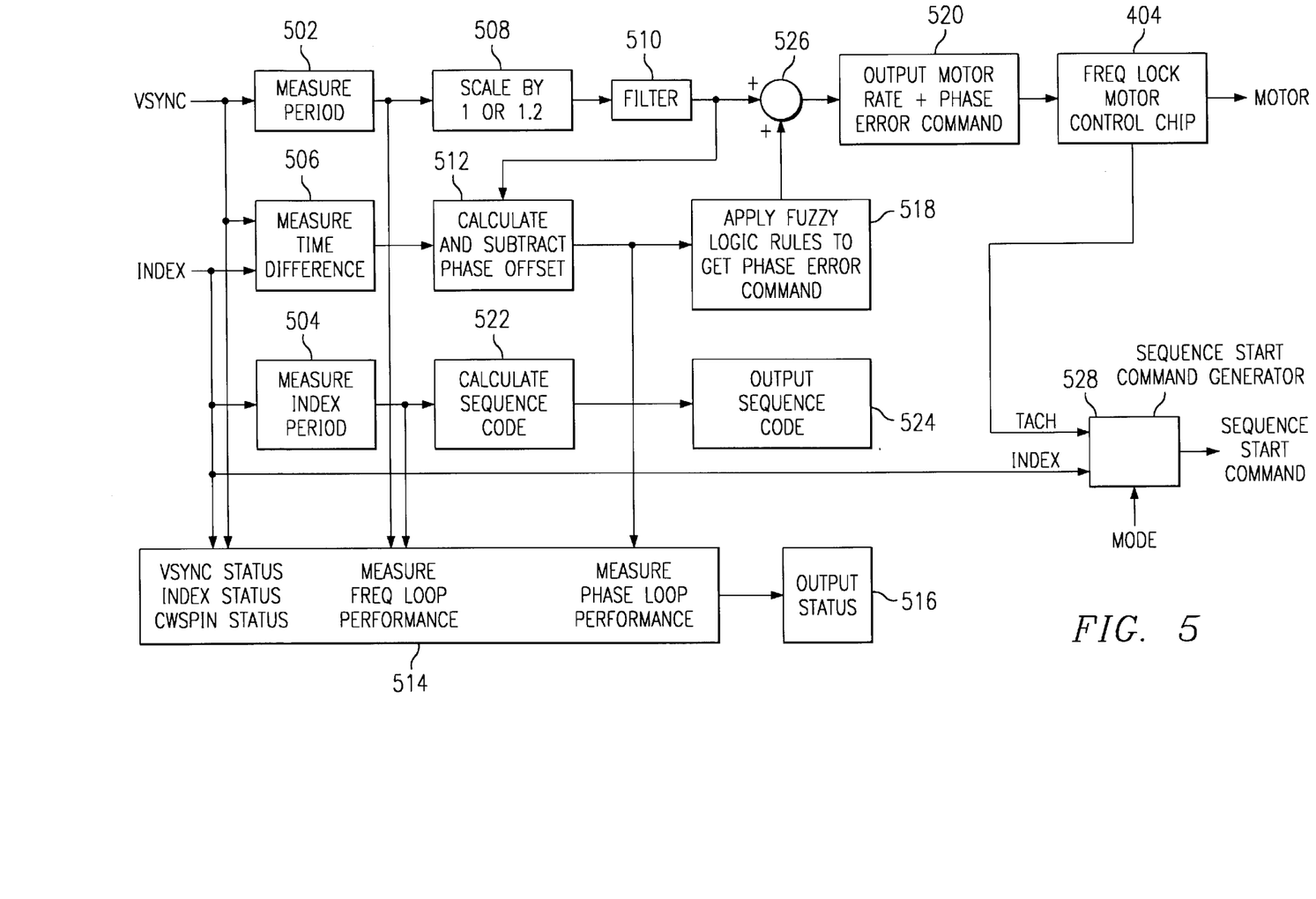
FIG. 5 is a block diagram one embodiment of a microcontroller of the motor control circuit in FIG. 4.

FIG. 5 is a block diagram of the operation of the microcontroller 406. Blocks 502 and 504 measure the periods of the VSYNC and INDEX signals. Block 506 measures the relative timing of VSYNC and INDEX to determine the amount of lead or lag between VSYNC and INDEX. The VSYNC period is scaled and filtered by blocks 508 and 510 to determine the desired motor speed. The output from block 510, which represents the desired motor speed is input to block 512 and used to determine the desired phase offset between VSYNC and INDEX. This phase offset is subtracted from the measured phase difference to generate the phase error. Block 518 processes the phase error to get the phase error command. Block 514 receives information from blocks 502, 504, and 512, as well as the VSYNC and INDEX signals, and determines the state of several status bits. The status bits, output by block 516, include bits to indicate the state of the VSYNC and INDEX signals, a bit to indicate that the color wheel is spinning at an acceptable speed, and several bits which indicate the current frequency-lock and phase-lock status of the system.

As discussed above, the VSYNC period is both scaled and filtered to determine the desired motor speed. A scale factor of 1 is used when the VSYNC signal has a frequency between 49 and 62.9 Hz. The unitary scale factor results in a motor speed equal to the video frame rate. If the frame rate increases to more than 62.9 Hz, the motor control circuit switches into a spoke-synchronous mode, which will be discussed below, and a scale factor of 1.2 is used. If the frame rate then drops below 62.6 Hz, the motor control circuit switches out of spoke-synchronous mode and the scale factor returns to 1.

The scaled and filtered VSYNC period from block 510 and the phase error command signal from block 518 are added by adder 526 to create the 14-bit reference period word which is output by block 520 to the motor driver circuit 404. Block 528 generates a sequence start command to the display electronics using INDEX for color display modes, or TACH for black and white display modes.

Spoke-Synchronous Mode

As the color wheel is turned faster, more power is required by the motor 402 and the time period each filter is in the light path is reduced. As the time period for each filter is reduced, it becomes more difficult to load and reset the modulator with each bit plane. Even when split-reset methods are used, fast frame rates may require reducing the number of bit planes displayed, or the use of blanking periods during which mirrors temporarily are turned off to allow the addressing circuitry beneath the mirrors to be loaded. Blanking periods lower the optical efficiency of the display system resulting in a reduced-brightness display.

Spoke-synchronous mode, which is described in U.S. Pat. application Ser. No. 08/659,485, entitled "Sequential Color Display System with Spoke Synchronous Frame Rate Conversion," filed on Jun. 6, 1996 and hereby incorporated by reference, is used to limit the velocity range over which the motor must operate, thereby increasing the efficiency of the display system. In spoke-synchronous mode, the color wheel is only turned 300° every VSYNC, or frame period, which results in the relationship between VSYNC and the color wheel changing 60° each frame period. Because the color wheel does not rotate an entire revolution each frame period, the proportion of time a given color filter is in the light path will not be equal for each color, and the color balance of the displayed image will be adversely affected. However, over a period of several frames, each of the three colors will be affected equally and a viewer will not notice that the color balance of each frame is incorrect.

VSYNC Filter

A VSYNC filter, which is described more fully in U.S. Pat. application Ser. No. 08/662,803, entitled "Tracking Filter," filed on Jun. 12, 1996 and hereby incorporated by reference, acts to smooth the measured period of the VSYNC signal. The filter incorporates both a first order response and a second order response to allow the smoothed VSYNC period to quickly respond to large changes in the input VSYNC period, which occur on a change in input source frame rates, while minimizing the response of the motor to spurious jumps in the VSYNC period, which may occur when a change in the input source causes a change in the VSYNC phase. A conventional second order filter designed to rapidly respond to changes in the input signal has a much larger overshoot.

Figure 6:
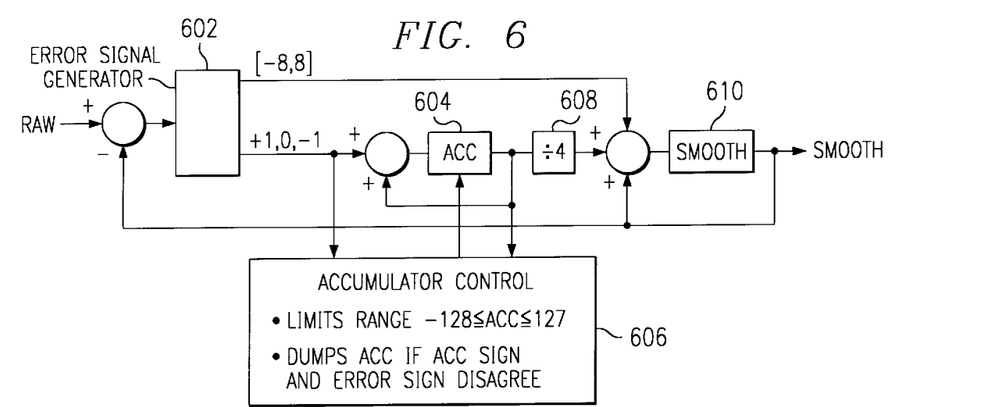
FIG. 6 is a block diagram of one embodiment of a filter shown in FIG. 5.

A block diagram of the filter is shown in FIG. 6. As shown in FIG. 6, the smoothed VSYNC period signal output by the filter is subtracted from the input VSYNC period to determine the VSYNC error. Error signal generation block 602 creates two error signals based on the VSYNC error. The first error signal, for use in the first order loop, is the VSYNC error divided by 16, plus one. The first error signal is limited to the range of +/−8 LSB. The second error signal, for use in the second order loop, is the VSYNC error limited to the range of +/−1 LSB.

The second error signal is integrated by accumulator 604 each VSYNC period. The accumulator controller 606 limits the range of the accumulator 604 between +127 and −128 LSBs. The accumulator controller also clears the accumulator 604 whenever the signs of the accumulator 604 and the second error signal disagree.

Figure 7:
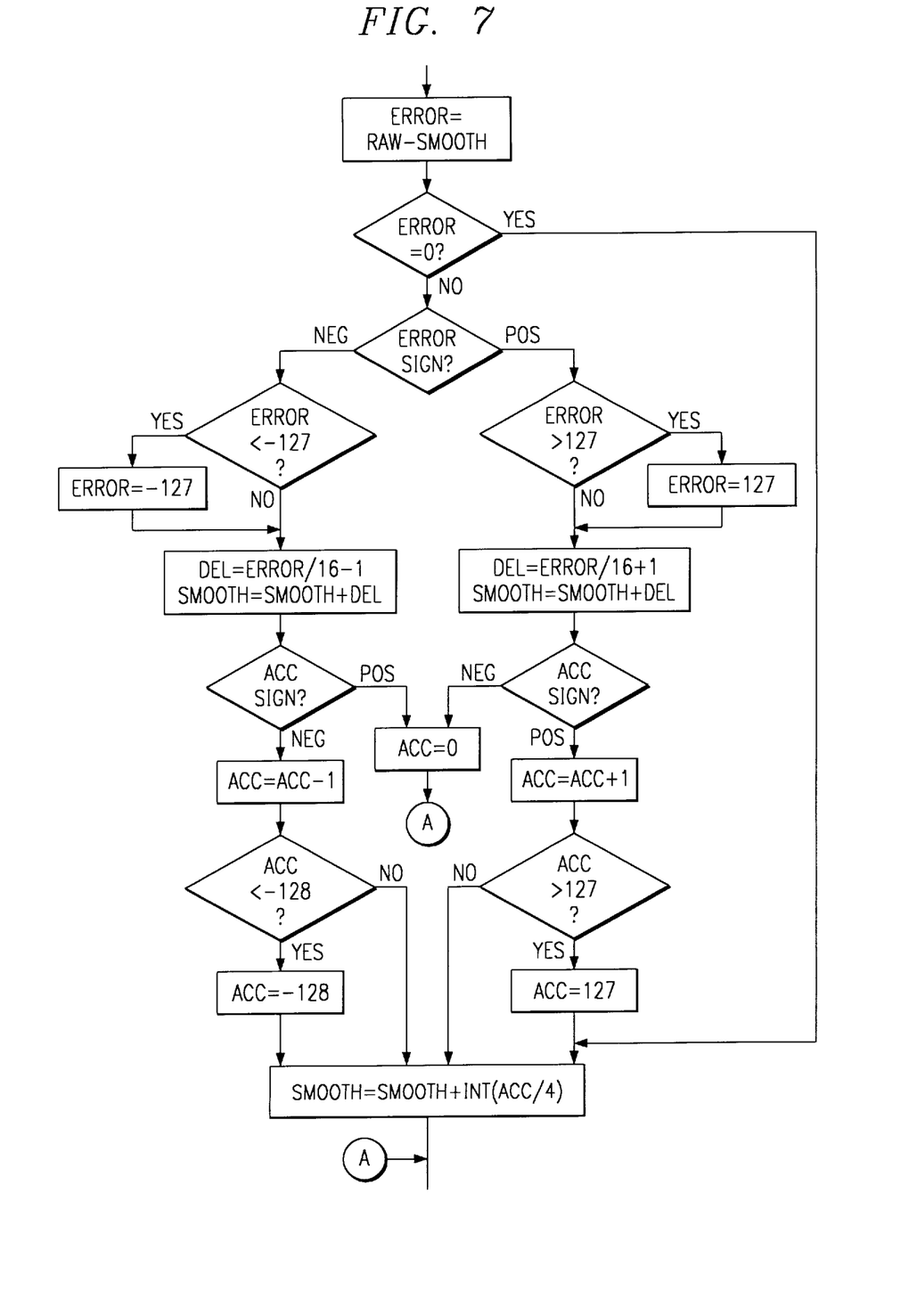
FIG. 7 is a flowchart detailing the operation of one embodiment of the VSYNC filter in FIG. 6.

The integrated second error signal from the accumulator 604 is divided by four and added to the first error signal and the previous value of the smoothed VSYNC period to create a new smoothed VSYNC period value. A flowchart detailing the operation of the VSYNC filter is shown in FIG. 7.

Phase Error Generation

The temporal relationship between the INDEX and VSYNC signals is used to determine the phase offset of the color wheel and to generate a phase error signal. One embodiment using the color wheel of FIG. 2 receives VSYNC as the motor rotates past the mid-point of the blue filter, and generates an INDEX signal at the red-blue boundary of the color wheel through the light path. This embodiment results in a desired phase offset, VSYNC to INDEX, of 300°. Of course, the relationship between INDEX, VSYNC, and the color wheel position is arbitrary.

The phase error signal represents the difference between the actual VSYNC to INDEX phase delay, and the desired phase offset. The microcontroller 406 calculates the actual phase delay by subtracting the VSYNC time-of-arrival from the INDEX time-of-arrival. The microcontroller 406 then subtracts the desired phase offset from the value of the actual phase delay, leaving the phase error value.

In spoke-synchronous mode, the desired phase offset varies for each frame of video data. Recall that in spoke-synchronous mode, the color wheel only rotates 300° during each frame of video data. Therefore, the desired phase offset must change each frame. In spoke-synchronous mode, the phase offset word continually follows the sequence, 300°, 240°, 180°, 120°, 60°, 0°.

Phase Commands

Figure 8:
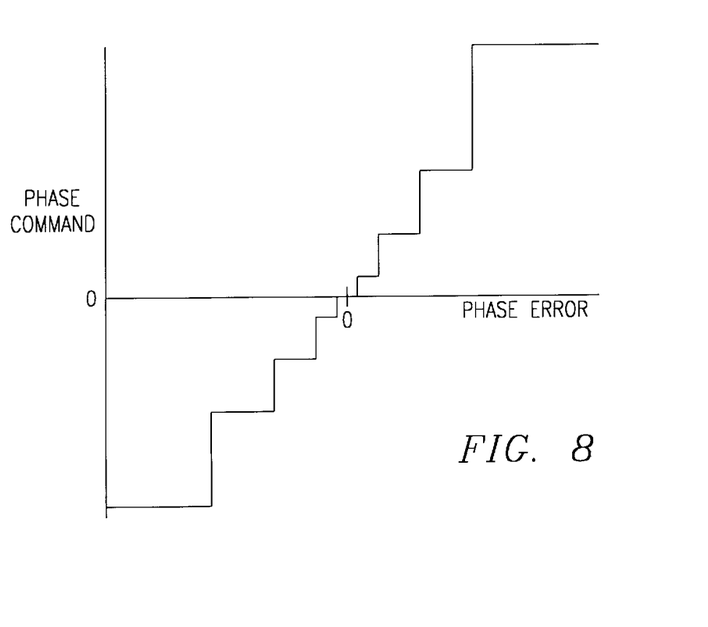
FIG. 8 is a plot of the phase command function showing the relationship between input phase error and the output phase command which is used by the motor driver to correct the phase error.

As shown by block 518 of FIG. 5, after the microcontroller 406 calculates the phase error, it translates the phase error into a phase command which is added to the VSYNC period word, and output to the motor driver 404. The magnitude of the phase command varies depending on the phase error, and is chosen to avoid phase tracking instability and overshoot. A graph of a typical phase command function 802 is shown in FIG. 8. In FIG. 8, the phase command function 802 is shown as a series of steps, each tending to drive the phase error toward zero. When the phase error is very small, the phase command is zero. As the phase error increases, the phase commands increase to quickly reduce the phase error to zero. In FIG. 8, the phase command function is linear and the step size doubles each step. Many other functions could be used to generate the phase commands including simply scaling the phase error, or scaling the phase error and limiting the magnitude of the phase command.

Sequence Codes

As the speed of the color wheel changes, the amount of time available to display an image during each revolution also changes. The speed of the color wheel will change whenever the input video signal changes frame rates. Also, changing video sources typically changes the speed of the color wheel as the system attempts to lock the phase of the color wheel to the new video signal. When the display system is in spoke-synchronous mode, the controller may step to a new phase offset to minimize the initial phase error and expedite the phase-lock process.

If the spatial light modulator is driven so that each image frame is the same length, a short frame display length must be chosen to avoid running over into the following color wheel frame period when the color wheel is spinning too quickly. Choosing a frame display period that is short enough to avoid problems when the color wheel is spinning too quickly reduces the efficiency of the display system when the color wheel is spinning at the proper speed because the spatial light modulator will not operate during the last portion of the color wheel frame period. Additionally, if a constant frame display length is too short, the spatial light modulator may begin to display a color plane while the color wheel is still filtering the light using the previous color filter.

To maximize the efficiency of the display system while avoiding color artifacts, the microcontroller 406 generates a sequence code, based on the color wheel period, which is used by the display system to control the length of the frame display period. As shown in FIG. 5, block 522 uses the measured index period to generate a sequence code which is output by block 524. In a first embodiment, 43 6-bit codes are used to communicate the length of the frame display period as determined by the actual color wheel speed.

The sequence codes are used to alter the bit display periods when there is a significant error in the color wheel frequency. For example, if the display system is changed from a 60 Hz frame rate signal to a 72 Hz frame rate signal, the system will enter spoke-synchronous mode and the color wheel will be rotating too fast for the new signal. Because the color wheel is rotating too fast, the image data bit periods for each color must be shortened in order to finish the video frame before the color wheel rotates 300°. The display period of a frame may be shortened by either shortening the bit periods, only displaying some of the bits, or both. In a first embodiment, 43 6-bit sequence codes are used to coordinate the color wheel with the rest of the display system.

Although the present invention has been discussed in terms of a color wheel motor controller, the novel features of this invention may be used in other fields, such as a motor controller for a video read/write head. Furthermore, although the present invention has been discussed with reference to a first embodiment having a integrated circuit motor controller and a microcontroller, the motor controller could be implemented using many other combinations of circuits including discrete logic gates or analog circuitry.

Thus, although there has been disclosed to this point a particular embodiment for a phase-lock motor control circuit and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A motor control system comprising:

a first timer circuit receiving a timing signal, measuring the period of said timing signal, and outputting a frequency signal representing said measured period of said timing signal;

a second timer circuit receiving said timing signal and an index signal from a motor, said index signal indicating when a motor rotor reaches a predetermined point, said second timer circuit measuring a relative delay between said timing signal and said index signal and outputting a phase error signal representing a different between said relative delay and a desired phase offset value;

a frequency command generator receiving said frequency signal and said phase error signal, and outputting a frequency command signal, said frequency command comprised of a frequency component determined by said frequency signal, and a phase component determined by said phase error signal; and a motor driver circuit receiving said frequency command and driving said motor at a speed determined by said frequency command, wherein said frequency component determines a base rate at which said motor is driven, and said phase component determines an offset to said base rate for adjusting the phase of said motor rotor relative to said timing signal.

2. A method of controlling a motor rotor, said method comprising:

measuring the period of a timing signal;

measuring the phase of a motor rotor relative to said timing signal;

determining a difference between said phase of said motor rotor relative to said timing signal and a desired phase offset;

generating a motor speed signal, said motor speed signal based on said measured period of said timing signal and said difference between said phase of said motor rotor relative to said timing signal and said desired phase offset; and driving a motor at a speed determined by said motor speed signal.

3. The method of claim 2, further comprising the step of:

changing said desired phase offset each revolution of said motor rotor.

4. The method of claim 2, said step of generating a motor speed signal comprising generating a motor speed signal proportional to said measured period of said timing signal.

5. A motor controller comprising:

a controller circuit receiving a synchronization signal and a motor position signal, said controller for measuring a period of said synchronization signal to obtain a desired speed word, said controller circuit also measuring the difference between said synchronization signal period and an index signal indicating the position of a motor, said controller circuit generating a phase error command indicative of a desired phase offset and the difference between said synchronization signal and said index signal, said controller circuit generating a speed command word equal to the sum of said desired speed word and said phase error command;

a motor driver circuit for receiving said speed command word from said controller circuit and for outputting drive signals to said motor to cause said motor to operate at a rate equivalent to said speed command word.

6. The motor controller of claim 5, said controller circuit for measuring a period of said index signal and for outputting a sequence code representative of said period.

7. The motor controller of claim 5, said controller circuit for measuring a period of said index signal and for outputting a sequence code representative of said period and said difference between said synchronization signal and said index signal.

8. The motor controller of claim 5, wherein said desired speed word is a 14-bit binary word.

9. The motor controller of claim 8, wherein said phase error command is a 4-bit binary word.

10. The motor controller of claim 8, wherein said phase error command is limited to $\frac{1}{1024}$ of the maximum value of said desired word.

11. The motor controller of claim 5, wherein said controller circuit measures said synchronization signal by counting periods of an input clock.

12. The motor controller of claim 5, wherein said controller circuit measures said synchronization signal by counting periods of a 10 MHz input clock.

13. The motor controller of claim 5, wherein said desired phase offset changes each revolution of said motor.

14. The motor controller of claim 5, wherein said controller circuit scales said measurement of said synchronization signal by a scale factor, such that said motor operates at a speed proportional to said synchronization signal.

15. The motor controller of claim 14, wherein said scale factor is 1.2.

* * * * *

UNITED STATES PATENT AND TRADEMARK OFFICE
CERTIFICATE OF CORRECTION

PATENT NO. : 5,880,573
DATED : March 9, 1999
INVENTOR(S) : Stephen W. Marshall, Richard C. Meyer, Harold E. Bellis, II

It is certified that error appears in the above-indentified patent and that said Letters Patent is hereby corrected as shown below:

On the title page, insert Item [60] under Related U.S. Application Data

--Provisional Application No. 60/000,172 June 13, 1995.--

Signed and Sealed this

Twentieth Day of March, 2001

Attest:

NICHOLAS P. GODICI

*Attesting Officer*    *Acting Director of the United States Patent and Trademark Office*